(12) United States Patent
Brewer et al.

(10) Patent No.: US 7,974,208 B2
(45) Date of Patent: *Jul. 5, 2011

(54) SYSTEM AND METHOD FOR ROUTER QUEUE AND CONGESTION MANAGEMENT

(75) Inventors: Tony M. Brewer, Plano, TX (US); Jim Kleiner, Dallas, TX (US); Gregory S. Palmer, Plano, TX (US); Keith W. Shaw, Plano, TX (US)

(73) Assignee: Foundry Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/777,069

(22) Filed: May 10, 2010

(65) Prior Publication Data

US 2010/0220742 A1    Sep. 2, 2010

Related U.S. Application Data

(63) Continuation of application No. 11/272,998, filed on Nov. 14, 2005, now Pat. No. 7,813,365, which is a continuation of application No. 09/740,923, filed on Dec. 19, 2000, now Pat. No. 7,002,980.

(51) Int. Cl.
*H04L 12/56* (2006.01)
*H04J 1/16* (2006.01)

(52) U.S. Cl. ............... 370/235.1; 370/252; 370/414; 370/419; 709/232

(58) Field of Classification Search ............... 370/229, 370/230, 235, 412, 413, 414, 417, 418, 429, 370/252, 419, 235.1; 709/232, 233, 235, 709/252

See application file for complete search history.

(56) References Cited

U.S. PATENT DOCUMENTS

| 4,683,564 A | 7/1987 | Young |
| 4,791,629 A | 12/1988 | Burns |
| 4,794,629 A | 12/1988 | Pastyr |
| 4,807,280 A | 2/1989 | Posner |
| 4,876,681 A | 10/1989 | Hagiwara |
| 4,985,889 A | 1/1991 | Frankish |

(Continued)

FOREIGN PATENT DOCUMENTS

CA    2273291 A1    11/2000

(Continued)

OTHER PUBLICATIONS

Stephen R. Haddock, Transcript, vol. 2, May 7, 2008.

(Continued)

*Primary Examiner* — John Pezzlo
(74) *Attorney, Agent, or Firm* — Park, Vaughan, Fleming & Dowler LLP; Shun Yao

(57) ABSTRACT

In a multi-QOS level queuing structure, packet payload pointers are stored in multiple queues and packet payloads in a common memory pool. Algorithms control the drop probability of packets entering the queuing structure. Instantaneous drop probabilities are obtained by comparing measured instantaneous queue size with calculated minimum and maximum queue sizes. Non-utilized common memory space is allocated simultaneously to all queues. Time averaged drop probabilities follow a traditional Weighted Random Early Discard mechanism. Algorithms are adapted to a multi-level QOS structure, floating point format, and hardware implementation. Packet flow from a router egress queuing structure into a single egress port tributary is controlled by an arbitration algorithm using a rate metering mechanism. The queuing structure is replicated for each egress tributary in the router system.

21 Claims, 4 Drawing Sheets

U.S. PATENT DOCUMENTS

| | | | |
|---|---|---|---|
| 5,101,404 A | 3/1992 | Kunimoto |
| 5,195,181 A | 3/1993 | Bryant |
| 5,224,108 A | 6/1993 | McDysan |
| 5,301,192 A | 4/1994 | Henrion |
| 5,307,345 A | 4/1994 | Lozowick |
| 5,323,386 A | 6/1994 | Wiher et al. |
| 5,365,512 A | 11/1994 | Combs |
| 5,390,173 A | 2/1995 | Spinney |
| 5,392,279 A | 2/1995 | Taniguchi |
| 5,406,643 A | 4/1995 | Burke |
| 5,408,469 A | 4/1995 | Opher |
| 5,430,442 A | 7/1995 | Kaiser |
| 5,436,893 A | 7/1995 | Barnett |
| 5,461,615 A | 10/1995 | Hanrion |
| 5,463,620 A | 10/1995 | Sriram |
| 5,506,840 A | 4/1996 | Pauwels |
| 5,521,923 A | 5/1996 | Willmann |
| 5,546,385 A | 8/1996 | Caspi |
| 5,550,816 A | 8/1996 | Hardwick |
| 5,566,170 A | 10/1996 | Bakke |
| 5,598,410 A | 1/1997 | Stone |
| 5,600,795 A | 2/1997 | Du |
| 5,619,497 A | 4/1997 | Gallagher |
| 5,640,504 A | 6/1997 | Johnson, Jr. |
| 5,649,110 A | 7/1997 | Ben-Nun |
| 5,663,952 A | 9/1997 | Gentry, Jr. |
| 5,663,959 A | 9/1997 | Nakagawa |
| 5,666,353 A | 9/1997 | Klausmeier |
| 5,721,819 A | 2/1998 | Galles |
| 5,732,080 A | 3/1998 | Ferguson |
| 5,740,176 A | 4/1998 | Gupta |
| 5,751,710 A | 5/1998 | Crowther |
| 5,815,146 A | 9/1998 | Youden |
| 5,835,496 A | 11/1998 | Yeung |
| 5,838,684 A | 11/1998 | Wicki |
| 5,862,350 A | 1/1999 | Coulson |
| 5,867,675 A | 2/1999 | Lomelino |
| 5,870,538 A | 2/1999 | Manning |
| 5,872,783 A | 2/1999 | Chin |
| 5,907,566 A | 5/1999 | Benson |
| 5,907,660 A | 5/1999 | Inoue |
| 5,909,686 A | 6/1999 | Muller |
| 5,915,094 A | 6/1999 | Kouloheris |
| 5,920,668 A | 7/1999 | Uehara |
| 5,920,886 A | 7/1999 | Feldmeier |
| 5,936,939 A | 8/1999 | Des Jardins |
| 5,936,967 A | 8/1999 | Baldwin |
| 5,978,359 A | 11/1999 | Caldara |
| 5,999,528 A | 12/1999 | Chow |
| 6,000,016 A | 12/1999 | Curtis |
| 6,023,471 A | 2/2000 | Haddock |
| 6,035,414 A | 3/2000 | Okazawa |
| 6,038,288 A | 3/2000 | Thomas |
| 6,067,301 A | 5/2000 | Aatresh |
| 6,076,115 A | 6/2000 | Sambamurthy |
| 6,081,522 A | 6/2000 | Hendel |
| 6,088,356 A | 7/2000 | Hendel |
| 6,094,434 A | 7/2000 | Kotzur |
| 6,104,700 A | 8/2000 | Haddock |
| 6,108,306 A | 8/2000 | Kalkunte |
| 6,118,787 A | 9/2000 | Kalkunte |
| 6,125,417 A | 9/2000 | Bailis |
| 6,128,666 A | 10/2000 | Muller |
| 6,144,668 A | 11/2000 | Bass |
| 6,151,301 A | 11/2000 | Holden |
| 6,151,615 A | 11/2000 | Brooks |
| 6,154,446 A | 11/2000 | Kadambi |
| 6,157,643 A | 12/2000 | Ma |
| 6,160,809 A | 12/2000 | Adiletta |
| 6,172,990 B1 | 1/2001 | Deb |
| 6,188,698 B1 | 2/2001 | Galand |
| 6,222,845 B1 | 4/2001 | Shue |
| 6,233,236 B1 | 5/2001 | Nelson |
| 6,243,667 B1 | 6/2001 | Kerr |
| 6,252,848 B1 * | 6/2001 | Skirmont ..................... 370/229 |
| 6,272,144 B1 | 8/2001 | Berenbaum |
| 6,320,859 B1 | 11/2001 | Momirov |
| 6,333,929 B1 | 12/2001 | Drottar |
| 6,335,935 B2 | 1/2002 | Kadambi |
| 6,343,072 B1 | 1/2002 | Bechtolsheim |
| 6,349,097 B1 | 2/2002 | Smith |
| 6,351,143 B1 | 2/2002 | Guccione |
| 6,356,550 B1 | 3/2002 | Williams |
| 6,356,942 B1 | 3/2002 | Bengtsson |
| 6,369,855 B1 | 4/2002 | Chauvel |
| 6,421,352 B1 | 7/2002 | Manaka |
| 6,424,658 B1 | 7/2002 | Mathur |
| 6,424,659 B2 | 7/2002 | Viswanadham |
| 6,427,185 B1 | 7/2002 | Ryals |
| 6,463,063 B1 | 10/2002 | Bianchini, Jr. |
| 6,470,436 B1 | 10/2002 | Croft |
| 6,473,433 B1 | 10/2002 | Bianchini, Jr. |
| 6,477,167 B1 | 11/2002 | Wu |
| 6,477,174 B1 | 11/2002 | Dooley |
| 6,483,347 B1 | 11/2002 | Baker |
| 6,490,280 B1 | 12/2002 | Leung |
| 6,522,656 B1 | 2/2003 | Gridley |
| 6,532,234 B1 | 3/2003 | Yoshikawa |
| 6,549,518 B1 | 4/2003 | Sugawara |
| 6,549,541 B1 | 4/2003 | Sainio |
| 6,553,370 B1 | 4/2003 | Andreev |
| 6,580,721 B1 | 6/2003 | Beshai |
| 6,587,404 B1 | 7/2003 | Keller |
| 6,608,819 B1 | 8/2003 | Mitchem |
| 6,611,522 B1 | 8/2003 | Zheng |
| 6,643,269 B1 | 11/2003 | Fan |
| 6,654,370 B1 | 11/2003 | Quirke |
| 6,654,373 B1 | 11/2003 | Maher, III et al. |
| 6,658,002 B1 | 12/2003 | Ross |
| 6,671,275 B1 | 12/2003 | Wong |
| 6,674,754 B1 | 1/2004 | Ofek |
| 6,678,248 B1 | 1/2004 | Haddock |
| 6,681,332 B1 | 1/2004 | Byrne |
| 6,687,247 B1 | 2/2004 | Wilford |
| 6,691,202 B2 | 2/2004 | Vasquez |
| 6,696,917 B1 | 2/2004 | Heitner |
| 6,697,359 B1 | 2/2004 | George |
| 6,697,368 B2 | 2/2004 | Chang |
| 6,700,694 B2 | 3/2004 | Zou |
| 6,707,818 B1 | 3/2004 | Kadambi |
| 6,711,357 B1 | 3/2004 | Brewer |
| 6,721,229 B1 | 4/2004 | Cole |
| 6,721,268 B1 | 4/2004 | Ohira |
| 6,721,313 B1 | 4/2004 | Duyne |
| 6,735,218 B2 | 5/2004 | Chang |
| 6,741,597 B1 | 5/2004 | Jeong |
| 6,751,224 B1 | 6/2004 | Parruck |
| 6,754,881 B2 | 6/2004 | Kuhlmann |
| 6,775,708 B1 | 8/2004 | Dadiomov |
| 6,778,546 B1 | 8/2004 | Epps |
| 6,781,990 B1 | 8/2004 | Puri |
| 6,792,484 B1 | 9/2004 | Hook |
| 6,792,502 B1 | 9/2004 | Pandya |
| 6,798,740 B1 | 9/2004 | Senevirathne |
| 6,804,731 B1 | 10/2004 | Chang |
| 6,807,179 B1 | 10/2004 | Kanuri |
| 6,807,363 B1 | 10/2004 | Abiko |
| 6,810,046 B2 | 10/2004 | Abbas |
| 6,813,243 B1 | 11/2004 | Epps |
| 6,816,467 B1 | 11/2004 | Muller |
| 6,822,940 B1 | 11/2004 | Zavalkovsky |
| 6,831,923 B1 | 12/2004 | Laor |
| 6,831,932 B1 | 12/2004 | Boyle |
| 6,839,346 B1 | 1/2005 | Kametani |
| 6,842,422 B1 | 1/2005 | Bianchini, Jr. |
| 6,854,117 B1 | 2/2005 | Roberts |
| 6,859,438 B2 | 2/2005 | Haddock |
| 6,865,153 B1 | 3/2005 | Hill |
| 6,879,559 B1 | 4/2005 | Blackmon |
| 6,894,970 B1 | 5/2005 | McDermott, III |
| 6,898,182 B1 | 5/2005 | Cloonan |
| 6,901,072 B1 | 5/2005 | Wong |
| 6,910,148 B1 | 6/2005 | Ho |
| 6,920,154 B1 | 7/2005 | Achler |
| 6,925,516 B2 | 8/2005 | Struhsaker |
| 6,937,606 B2 | 8/2005 | Basso |
| 6,938,179 B2 | 8/2005 | Iyer |

| | | |
|---|---|---|
| 6,946,948 B2 | 9/2005 | McCormack |
| 6,957,258 B2 | 10/2005 | Maher, III |
| 6,959,007 B1 | 10/2005 | Vogel |
| 6,975,639 B1 | 12/2005 | Hill |
| 6,977,943 B2 | 12/2005 | Zboril |
| 7,009,968 B2 | 3/2006 | Ambe |
| 7,012,919 B1 | 3/2006 | So |
| 7,050,430 B2 | 5/2006 | Kalkunte |
| 7,073,005 B1 | 7/2006 | Basu |
| 7,093,160 B2 | 8/2006 | Lau |
| 7,126,956 B2 | 10/2006 | Scholten |
| 7,133,399 B1 | 11/2006 | Brewer |
| 7,151,797 B2 | 12/2006 | Limberg |
| 7,161,948 B2 | 1/2007 | Sampath |
| 7,167,471 B2 | 1/2007 | Calvignac |
| 7,185,141 B1 | 2/2007 | James |
| 7,185,266 B2 | 2/2007 | Blightman |
| 7,187,687 B1 | 3/2007 | Davis |
| 7,191,277 B2 | 3/2007 | Broyles |
| 7,191,466 B1 | 3/2007 | Hamid |
| 7,191,468 B2 | 3/2007 | Hanner |
| 7,203,194 B2 | 4/2007 | Chang |
| 7,206,283 B2 | 4/2007 | Chang |
| 7,212,536 B2 | 5/2007 | Mackiewich |
| 7,224,670 B2 | 5/2007 | Jeffries |
| 7,236,453 B2 | 6/2007 | Visser |
| 7,236,490 B2 | 6/2007 | Chang |
| 7,266,117 B1 | 9/2007 | Davis |
| 7,269,133 B2 | 9/2007 | Lu |
| 7,283,470 B1 | 10/2007 | Sindhu |
| 7,292,535 B2 | 11/2007 | Folkes |
| 7,324,500 B1 | 1/2008 | Blackmon |
| 7,356,030 B2 | 4/2008 | Chang |
| 7,382,728 B2 | 6/2008 | Chen |
| 7,382,736 B2 | 6/2008 | Mitchem |
| 7,430,169 B2* | 9/2008 | Allen et al. ................ 370/235 |
| 7,558,197 B1* | 7/2009 | Sindhu et al. ............... 370/230 |
| 7,558,270 B1* | 7/2009 | Wilford et al. .......... 370/395.42 |
| 2001/0007560 A1 | 7/2001 | Masuda |
| 2001/0048785 A1 | 12/2001 | Steinberg |
| 2001/0053150 A1 | 12/2001 | Clear |
| 2002/0012585 A1 | 1/2002 | Kalkunte |
| 2002/0054594 A1 | 5/2002 | Hoof |
| 2002/0069294 A1 | 6/2002 | Herkersdorf |
| 2002/0073073 A1 | 6/2002 | Cheng |
| 2002/0089977 A1 | 7/2002 | Chang |
| 2002/0091884 A1 | 7/2002 | Chang |
| 2002/0097713 A1 | 7/2002 | Chang |
| 2002/0105966 A1 | 8/2002 | Patel |
| 2002/0126672 A1 | 9/2002 | Chow |
| 2002/0146013 A1 | 10/2002 | Karlsson |
| 2003/0009466 A1 | 1/2003 | Ta |
| 2003/0033435 A1 | 2/2003 | Hanner |
| 2003/0043800 A1 | 3/2003 | Sonksen |
| 2003/0048785 A1 | 3/2003 | Calvignac |
| 2003/0103499 A1 | 6/2003 | Davis |
| 2003/0110180 A1 | 6/2003 | Calvignac |
| 2003/0152084 A1 | 8/2003 | Lee |
| 2003/0165160 A1 | 9/2003 | Minami |
| 2003/0174719 A1 | 9/2003 | Sampath |
| 2003/0177221 A1 | 9/2003 | Ould-Brahim |
| 2003/0215029 A1 | 11/2003 | Limberg |
| 2004/0022263 A1 | 2/2004 | Zhao |
| 2004/0062246 A1 | 4/2004 | Boucher |
| 2004/0128434 A1 | 7/2004 | Khanna |
| 2004/0179548 A1 | 9/2004 | Chang |
| 2005/0041684 A1 | 2/2005 | Reynolds |
| 2005/0089049 A1 | 4/2005 | Chang |
| 2005/0132132 A1 | 6/2005 | Rosenbluth |
| 2005/0175018 A1 | 8/2005 | Wong |
| 2006/0114876 A1 | 6/2006 | Kalkunte |
| 2007/0179909 A1 | 8/2007 | Channasagara |
| 2007/0208876 A1 | 9/2007 | Davis |
| 2007/0235420 A1 | 10/2007 | Yamazawa |
| 2007/0253420 A1 | 11/2007 | Chang |
| 2007/0258475 A1 | 11/2007 | Chinn |
| 2007/0288690 A1 | 12/2007 | Wang |
| 2008/0002707 A1 | 1/2008 | Davis |
| 2008/0049742 A1 | 2/2008 | Bansal |
| 2008/0225859 A1 | 9/2008 | Mitchem |

FOREIGN PATENT DOCUMENTS

| | | |
|---|---|---|
| EP | 0987861 A2 | 3/2000 |
| EP | 0987861 A3 | 3/2000 |
| WO | 0184728 A1 | 11/2001 |
| WO | 2004014002 A1 | 2/2004 |

OTHER PUBLICATIONS

Demers, Alan et al., "Analysis and Simulation of a Fair Queueing Algorithm", Internetworking: Research and Experience, vol. 1, 3-26 (1990).

Keshav, S. "An Engineering Approach to Computer Networking ATM Networks, the Internet, and the Telephone Network", AT&T Lab Research, ISBN 0201634422, 5th Printing, Aug. 1999, part 1 of 5.

Keshav, S. "An Engineering Approach to Computer Networking ATM Networks, the Internet, and the Telephone Network", AT&T Lab Research, ISBN 0201634422, 5th Printing, Aug. 1999, part 2 of 5.

Keshav, S. "An Engineering Approach to Computer Networking ATM Networks, the Internet, and the Telephone Network", AT&T Lab Research, ISBN 0201634422, 5th Printing, Aug. 1999, part 3 of 5.

Keshav, S. "An Engineering Approach to Computer Networking ATM Networks, the Internet, and the Telephone Network", AT&T Lab Research, ISBN 0201634422, 5th Printing, Aug. 1999, part 4 of 5.

Keshav, S. "An Engineering Approach to Computer Networking ATM Networks, the Internet, and the Telephone Network", AT&T Lab Research, ISBN 0201634422, 5th Printing, Aug. 1999, part 5 of 5.

"GIGAswitch System Manager's Guide", Part Number: EK-GGMGA-MG.A01, Jun. 1993, Exhibit D. pp. 1-237.

Gigabit Ethernet Alliance, "Accelerating the Standard for Speed", Copyright 1998, 10 pages.

C. Partridge, "A Proposed Flow Specification", Sep. 1992, Networking Working Group.

Foundry Networks, "Next Generation Terabit System Architecture—The High Performance Revolution for 10 Gigabit Networks", Nov. 17, 2003.

Floyd, Sally et al., "Random Early Detection Getaways for Congestion Avoidance", Aug. 1993, IEEE/ACM Transactions on Networking, Abstract.

Degermark, Mikael et al., "Small Forwarding Tables for Fast Routing Lookups", ACM Computer Communications Review, 27(4): 3-14, Oct. 1997.

Braden et al., "Recommendations on Queue Management and Congestion Avoidance in the Internet", Network Working Group, Apr. 1998.

Belhadj, Med et al., "Feasibility of a 1000GE MAC", IEEE Meeting, Nov. 2006, 18 pages.

Demers, Alan et al., "Analysis and Simulation of a Fair Queueing Algorithm", 1990, Xerox PARC, pp. 1-12.

Office Action, filed Mar. 3, 2009, U.S. Appl. No. 90/010,434, date mailed May 22, 2009, inventor No. 6104700.

Office Action, filed 30/30/2009, U.S. Appl. No. 90/010,433, date mailed May 22, 2009, inventor No. 6859438.

Office Action, filed 30/30/2009, U.S. Appl. No. 90/010,432, date mailed May 21, 2009, inventor No. 6678248.

U.S. Appl. No. 09/703,038, filed Oct. 31, 2000, Tony M. Brewer et al.

10 Gigabit Ethernet—Technology Overview White Paper, Sep. 2001, 16 pages.

10 Gigabit Ethernet Alliance, Interconnection with Wide Area Networks, Version 1.0, Mar. 2002, 5 pages.

Floyd, Sally et al., "Link-sharing and Resource Management Models for Packet Networks", IEEE/ACM Transactions on Networking, vol. 3, No. 4, Aug. 1995.

European Partial Search Report issued for EP 01 31 0554, dated Nov. 19, 2004.

Mindspeed—A Contextual Business, "17X17 3.2 Gbps Crosspoint Switch with Input Equalization—M21110", Feb. 1, 2001, 2 pages.

Mindspeed—A Conexant Business, "Switch Fabric Chipset—CX27300 iScale.TM.", Apr. 30, 2001, 2 pages.

Matsumoto et al., "Switch Fabrics Touted at Interconnects Conference", Aug. 21, 2000, URL=http;//www.eetimes.com/story/OGE2000821S0011, accessed Aug. 12, 2002, 2 pages.

Stallings, William; "High-Speed Networks TCP/IP and ATM Design Principles", Prentice-Hall, Inc., Upper Saddle River, New Jersey, pp. 174-179, 1998.

Startan et al., "Out of Order Incremental CRC Computation", IEEE Transactions on Computers, 54(9): 1178-1181 (Sep. 2005).

McAuley et al., "Fast Routing Table Lookup Using CAMs", Proceedings of INFOCOM, Mar.-Apr. 1993, pp. 1382-1391.

The Tolly Group, "Foundry Networks Inc.—BigIron 4000, Layer 2 & Layer 3 Interoperability Evaluation", No. 199133, Oct. 1999, 4 pages.

The Tolly Group, "Foundry Network Inc.—BigIron 8000 Gigabit Ethernet Switching Router, Layer 2 & Layer 3 Performance Evaluation", No. 199111, May, 1999, 4 pages.

Foundry Networks, "BigIron Architecture Technical Brief", Oct. 1998—Version 1.0, 15 pages.

Foundry Networks, "BigIron Architecture Technical Brief", Oct. 1998—Version 1.02, 15 pages.

Foundry Networks, "BigIron Architecture Technical Brief", Dec. 1998—Version 1.03, 14 pages.

Foundry Networks, "BigIron Architecture Technical Brief", May 1999—Version 2.00, 15 pages.

Foundry Networks, "BigIron Architecture Technical Brief", May 1999—Version 2.01, 15 pages.

Foundry Networks, "BigIron Architecture Technical Brief", Jul. 2001—Version 2.02, 16 pages.

Meir Communications Inc., "Lab Testing Summary Report-Product Category: Layer-3 Switches, Vendor Tested: Product Tested: Foundry Networks, BigIron 4000", Report No. 231198, Oct. 1998, 6 pages Meir Communications Inc., "Lab Testing Summary Report-Product Category: Gigabit backbone Switches, Vendor Tested: Foundry Networks, Product Tested: BigIron 4000", Report No. 210998, Sep. 1998, 6 pages.

May, Martin et al., "An Experimental Implementation of Traffic Control for IP Networks", INRIA BP 93, 1993.

Foundry Networks, "JetCore TM. Based Chassis Systems—An Architecture Brief on NetIron, BigIron, and FastIron systems", Jan. 17, 2003.

Braden, R. et al., "Integrated Services in the Internet Architecture: an Overview Status of this Memo", Network Working Group, Jul. 1994.

Braun, Florian et al., "Fast Incremental CRC updates for IP over ATM Networks", IEEE Workshop on High Performance Switching and Routing, 2001, pp. 48-52.

"GIGAswitch/FDDI System—Manager's Guide", Part No. EK-GGMGA-MG.B01, Digital Equipment Corporation, Maynard, Massachusetts, 1993.

Kichorowsky, Roman et al., "Mindspeed TM. Switch Fabric Offers the Most Comprehensive Solution for Multi-Protocol Networking Equipment", Apr. 30, 2001, 3 pages.

Stallings, William; "High-Speed Networks TCP/IP and ATM Design Principles", Prentice-Hall, Inc., Upper Saddle River, New Jersey,1998, pp. 147-179.

May, Martin et al., "An Experimental Implementation of Traffic Control for IP Networks", INRIA BP, 1993.

"GIGAswitch/FDDI System-Manager's Guide", Part No. EK-GGMGA-MG.B01. Digital Equipment Corporation, Maynard, Massachusetts, 1993.

* cited by examiner

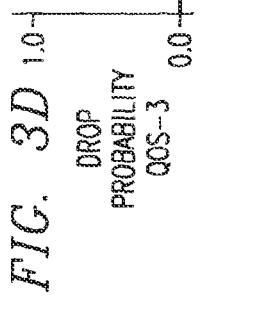
FIG. 3C
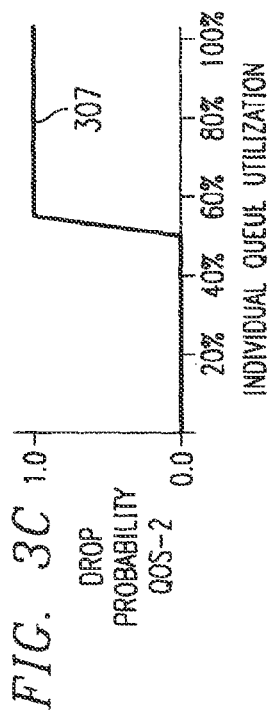
FIG. 4A
FIG. 4C
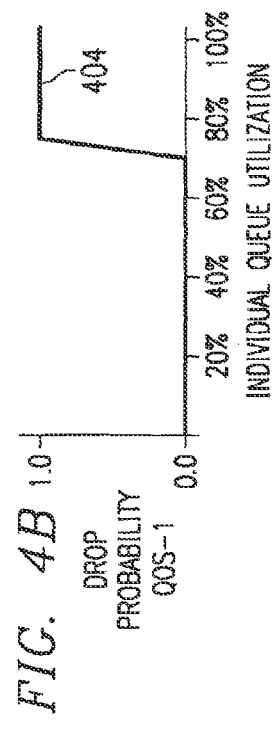
FIG. 3D
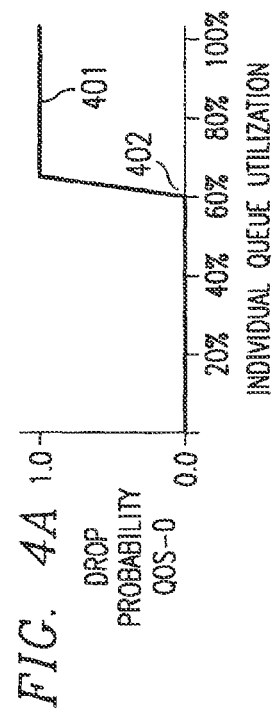
FIG. 4B
FIG. 4D
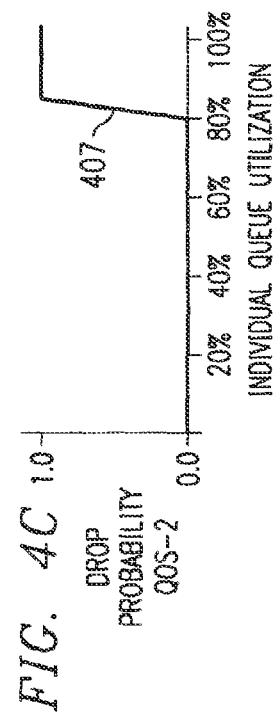

SYSTEM AND METHOD FOR ROUTER QUEUE AND CONGESTION MANAGEMENT

This application is a continuation of, and hereby claims priority under 35 U.S.C. §120 to, co-pending U.S. patent application Ser. No. 11/272,998, filed on 14 Nov. 2005, entitled "System and Method for Router Queue and Congestion Management", by inventors Tony M. Brewer, Jim Kleiner, Gregory S. Palmer, and Keith W. Shaw, which is a continuation of U.S. patent application Ser. No. 09/740,923, filed 19 Dec. 2000 and issued as U.S. Pat. No. 7,002,980 on 21 Feb. 2006, entitled "System and Method for Router Queue and Congestion Management", by inventors Tony M. Brewer, Jim Kleiner, Gregory S. Palmer, and Keith W. Shaw.

This application is related to U.S. patent application Ser. No. 09/703,057, entitled "System and Method for IP Router with an Optical Core," now abandoned, to U.S. application Ser. No. 09/703,056, entitled "System and Method for Router Central Arbitration," issued as U.S. Pat. No. 7,133,399 on 7 Nov. 2006, to U.S. application Ser. No. 09/703,038, entitled "System and Method for Router Data Aggregation and Delivery," issued as U.S. Pat. No. 7,613,183 on 3 Nov. 2009, to U.S. application Ser. No. 09/702,958, entitled "Timing and Synchronization for IP Router Using an Optical Switch," issued as U.S. Pat. No. 6,711,357 on 23 Mar. 2004, to U.S. application Ser. No. 09/703,027, entitled "Router Network Protection Using Multiple Facility Interfaces," issued U.S. Pat. No. 7,324,500 on 29 Jan. 2008, to U.S. application Ser. No. 09/703,043, entitled "Router Line Card Protection Using One-for-N Redundancy", issued as U.S. Pat. No. 6,879,559 on 12 Apr. 2005, and to U.S. application Ser. No. 09/703,064, entitled "Router Switch Fabric Protection Using Forward Error Correction," issued as U.S. Pat. No. 6,894,970 on 17 May 2005, the disclosures of which are incorporated herein by reference.

TECHNICAL FIELD

This application relates to the field of optical communication networks, and particularly to large-scale routers for optical communication networks.

BACKGROUND

A router system has a number of ingress ports that feed information, e.g., data packets to a switching fabric. The switching fabric then routes the information to egress routing ports. In such a system, typically the switching fabric on a per port basis has more bandwidth going into and out of the switch than is actually needed by the ports, such that typically there is more bandwidth capability feeding into an egress port than is feeding out of the egress port. Under these circumstances, queuing within that egress port can become very congested. The queues can fill up, and an intelligent mechanism is needed in order to manage those queues such that traffic is not dropped indiscriminately. In a system having multiple Quality of Service (QOS) levels, particular attention must be paid such that each level has its dedicated queuing space. Yet when the overall queuing space is not heavily utilized, it is desirable that the remaining queues can grow and use more space than they normally would be allotted.

SUMMARY OF THE INVENTION

The present invention is directed to a system and method for managing both instantaneous and time averaged queue congestion in a multi-QOS level queuing structure having a common shared memory pool. Packet payload pointers are stored in multiple queues, each of which represents a distinct QOS priority level, and packet information payloads are stored in the common memory pool. Instantaneously, if an incoming packet causes one of the QOS levels to reach its allocated memory space limitation, then it must be determined whether to discard the packet or not. Algorithms control the drop probability of packets entering the queuing structure.

The instantaneous management algorithm determines the total amount of shared memory space in bytes and monitors the instantaneous actual sizes of the individual queues. The algorithm dynamically calculates a minimum and a maximum queue size for each queue, using the percent utilization of the common memory pool. Any non-utilized common memory space is allocated simultaneously to all of the queues sharing the common memory pool, advantageously providing all queues more than their allocated memory space. A drop probability is calculated from a comparison of actual instantaneous queue size with minimum and maximum queue sizes.

The time averaged congestion management follows a traditional Weighted Random Early Discard (WRED) mechanism. However, both instantaneous and weighted time averaged congestion management are adapted to a multi-level QOS structure as well as to floating point calculations as opposed to a complex multi-dimensional table driven mechanism. In some embodiments the algorithms are implemented in hardware.

Particularly, the present invention is directed to an egress queuing system in a router, such that packets flow out of the queuing structure into a single tributary of a router egress port. The packet flow out of the queuing system is controlled on a QOS priority basis by an egress tributary arbitration algorithm using a rate metering mechanism. Packets are received into the queuing structure from an egress reassembly logic. The queuing structure is replicated for each egress tributary in the router system.

When the queues fill up near their capacity, the present mechanism manages those queues, such that lower priority traffic is dropped more frequently than higher priority traffic, but at the same time lower priority traffic is not completely dropped but rather is only relegated to a smaller percentage of the overall space within that memory system.

Various aspects of the invention are described in co-pending and commonly assigned U.S. application Ser. No. 09/703,057, entitled "System And Method For IP Router With an Optical Core," co-pending and commonly assigned U.S. application Ser. No. 09/703,056, entitled "System and Method for Router Central Arbitration," co-pending and commonly assigned U.S. application Ser. No. 09/703,038, entitled "System and Method for Router Data Aggregation and Delivery," co-pending and commonly assigned U.S. application Ser. No. 09/702,958, entitled "Timing and Synchronization for an IP Router Using an Optical Switch," co-pending and commonly assigned U.S. application Ser. No. 09/703,027, entitled "Router Network Protection Using Multiple Facility Interfaces," co-pending and commonly assigned U.S. application Ser. No. 09/703,043, entitled "Router Line Card Protection Using One-for-N Redundancy" and co-pending and commonly assigned U.S. application Ser. No. 09/703,064, entitled "Router Switch Fabric Protection Using Forward Error Correction," all filed Oct. 31, 2000, the disclosures of which are incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 3A-3D are graphic representations showing how the drop probabilities are modified when the total of the four QOS levels now consume only 80% of the common memory space;

FIGS. 4A-4D are graphic representations of calculated drop probability when total common memory space of 50% is utilized.

DETAILED DESCRIPTION

Figure 1:
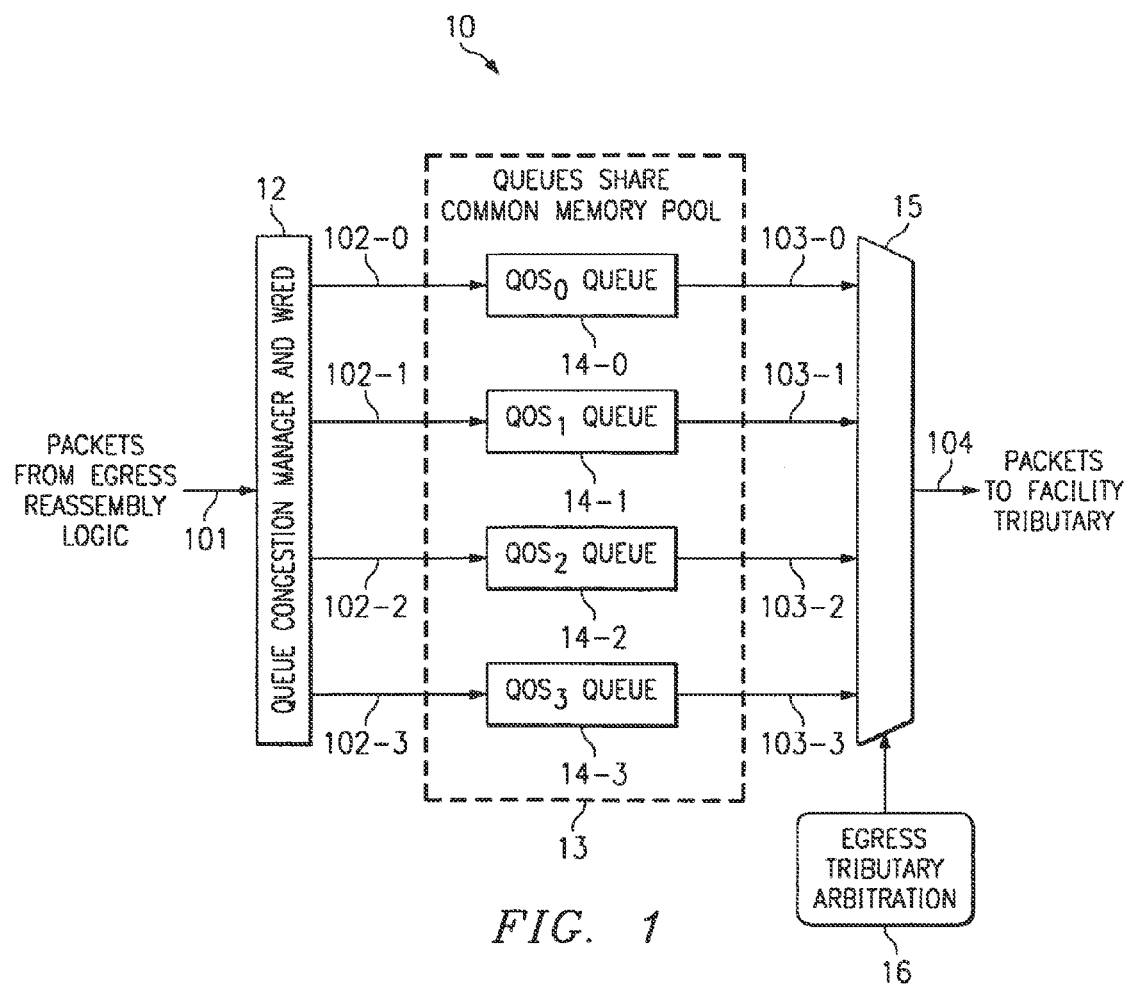
FIG. 1 is a schematic diagram illustrating an egress queuing structure.

FIG. 1 is a schematic diagram illustrating an egress queuing structure 10. Packets arrive from egress reassembly logic (not shown) within an egress ASIC through link 101. Prior to the arrival of these packets, a router switching fabric has supplied chunks of information to the egress ASIC, which has separated the individual packets out of the chunks and reassembled the larger packets, such that the packets received through link 101 are reassembled complete packets. Those packets enter Queue Congestion Manager and Weighted Random Early Discard (WRED) Block 12.

Queue Congestion Manager Block 12 determines whether packets should be forwarded to the actual queuing in the egress structure or whether packets should be dropped due to congestion. There are instantaneous congestion issues as well as time averaged congestion issues. Packets emerge out of Queue Congestion Manager Block 12 through four separate links 102-0 through 102-3, each of which carries packets destined for a particular quality of service (QOS) level queue 14-0 through 14-3. Each of queues 14-0 through 14-3 stores individual packet payload pointers; however, the actual packet data for all four queues is stored in a common shared memory pool 13.

An egress tributary arbitration block 16, responsible for determining which packet is next to go out through a link 104, gives selection information to a selection MUX 15, which selects one of the four egress queues 14-0 through 14-3 from which to remove information through links 103-0 through 103-3.

Each egress port can have one or multiple egress tributaries associated with it. For example an OC192c port, which is a 10 gigabit per second (Gb/s) port, can have one tributary feeding that egress port, which would consume all 10 Gb/s of bandwidth. On the other hand, smaller bandwidth tributaries feeding that egress port, for example, four tributaries each having 2.5 Gb/s of bandwidth, would then equal the overall port bandwidth of 10 Gb/s.

In FIG. 1, link 104 represents the output of a single tributary going out of queuing structure 10. In an output port structure, if there are multiple tributaries, then entire queuing structure 10 would be replicated on each of the tributaries. On link 101 packets would come from a common reassembly logic, and packets designated to each individual tributary would be directed toward the appropriate queuing structure for that tributary. Thus queuing structure 10 would be replicated as many times as the number of tributaries for that particular port. However, the queues from all tributaries share a common memory pool.

A certain bandwidth is pre-allocated to each of the four QOS levels that exist in egress queuing structure 10. An arbitration algorithm controls the flow of data from each QOS level QOS-0 through QOS-3, such that each QOS level receives its fair share of the bandwidth going out of the egress port. However, if there is underutilized bandwidth from any of the QOS levels, which will result in excess bandwidth capacity for that port, then if there are any queues that have packets available, even though these queues have exhausted their current bandwidth allocation, then those queues are allowed to send additional packets out through the egress port.

A rate metering mechanism operates such that periodically, tokens are put into a counter that can for example be 16 or 32 bits in size. Every so many clock periods, a certain number of tokens or count is added to the rate meter. Then, as packets are selected from the queue associated with that rate meter, a certain number of tokens are removed from the rate meter by deducting a quantity associated with the length of the packet, such that the tokens are then associated with a certain amount of bytes out of the packet, or a certain bandwidth through the tributary. Thus, periodically the QOS rate meter is replenished, and then, as packets are extracted from the queue, tokens are deducted from the rate meter.

For example, if a token is equivalent to a byte, then for a 40 byte packet, 40 tokens are deducted from that rate meter. Similarly, the number of tokens added to the rate meter on a periodic basis is equivalent to the amount of bandwidth in bytes per time unit, allocated for that particular QOS level. The rate meter has a maximum number of tokens as well as a minimum number. For example, the minimum number may be 0, in which case if packets are removed, such that the rate meter would go below 0, it may truncate to keep the token level at a value 0. Similarly a rate meter is not allowed to continue to increase its number of tokens indefinitely if no packets are going out.

In the present implementation an egress tributary arbitration algorithm applies a set of code, namely (1.0)//find next packet to send, first check token buckets which are positive

```
for (qos=0, pkt=0; !pkt&&qos<MAX_QOS_LEVELS; qos+=1)
if (qosMeter[qos].tokenCnt (trib) >0 & &
(pkt=txQueue.unlink_first(trib,qos)))
{qosMeter[qos].decTokenCnt(trib, pkt->posSize( ))}
```

(1.1)//next check token buckets which are negative

```
for (qos=0; !pkt&&qos < MAX_QOS_LEVELS; qos+=1)
if (qosMeter
[qos].tokenCnt(trib)<=0&&(pkt=txQueue.unlink_first(trib,qos)))
{qosMeter[qos].decTokenCnt(trib, pkt->posSize( ))}
```

Section 1.0 of the arbitration algorithm indexes through each of the four QOS levels and determines if there is a packet in that level and if so, if there are positive rate metering tokens for that QOS level. Thus, if there is a packet available and there are positive QOS tokens available, a packet is extracted from that queue. If there is no packet ready, or if the token meter is negative, then the algorithm proceeds to the next QOS level and repeats the same procedure. This procedure repeats sequentially through all four QOS levels.

Next in Section 1.1 the algorithm cycles through all four QOS levels again to determine whether there are packets ready to go on meters that are negative, i.e., that have already exhausted their quota of bandwidth. Again the algorithm indexes from the highest priority QOS level 0 to lowest priority QOS level 3. The same algorithm could be applied to any number of QOS levels.

Figure 2A:
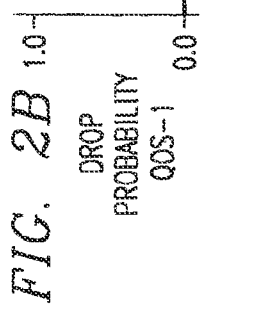
FIGS. 2A-2D are graphic representations of drop probability curves for the instantaneous management function of the Queue Congestion Management Block of FIG. 1.

FIGS. 2A-2D are graphic representations of drop probability curves for the instantaneous management function of Queue Congestion Management Block 12 of FIG. 1. When a packet is ready to be assigned to a queue, these drop probabilities are examined to determine if the packet should be placed in the queue or dropped. Drop probability curves FIGS. 2A-2D show drop probabilities calculated when the common memory pool is completely or very nearly full. FIG. 2A shows that for QOS level 0 queue 14-0 on Curve 201, the drop probability starts out at 0 and stays at 0 until a threshold utilization 202, which occurs at 10% queue utilization. The drop probability then increases to unity at roughly 15% queue utilization and remains there for all higher values of queue utilization. This limits the amount of the common memory space that is available for QOS level 0 to 10% before any packet drops start occurring. The slope between point 202 and 203 is such that a small amount of traffic will be dropped initially, if the amount of space is used in excess of what is allocated to it, but if utilization increases beyond an additional 5%, then all subsequent packets will be dropped.

Figure 2C:
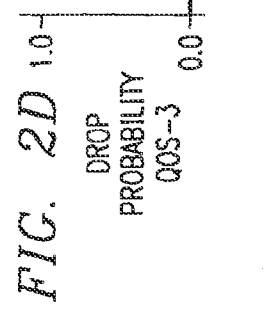
Figure 2B:
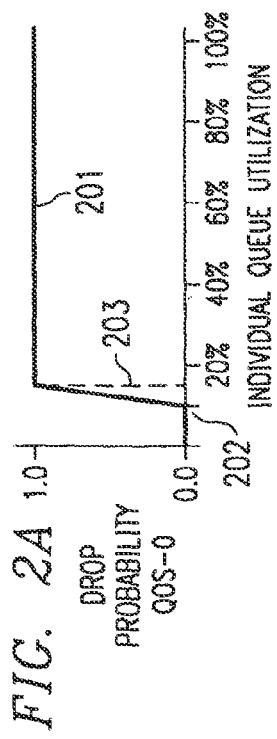
Figure 2D:
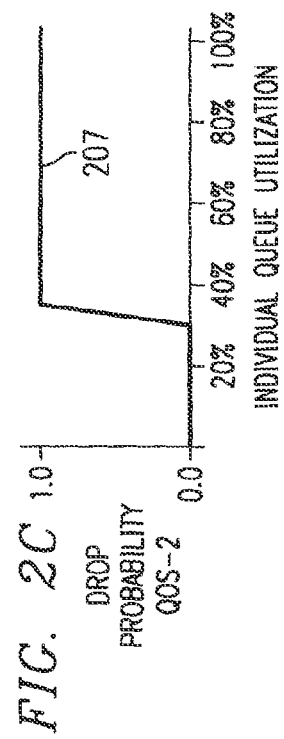
Figure 3B:
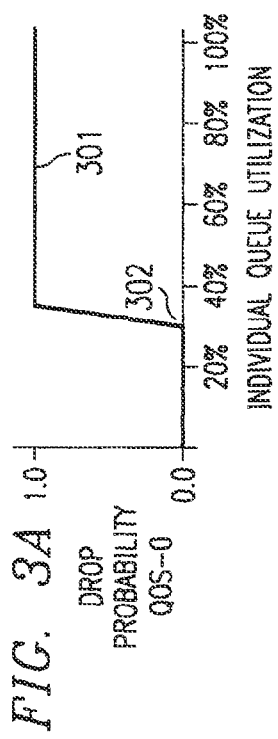

In FIG. 2B, curve 204 for QOS 1 queue 14-1 starts at a threshold of 20% under an assumption that the QOS level 1 is allotted twice as much bandwidth as is QOS level 0. Similarly QOS levels 2 and 3 are allotted 30% and 40% respectively, as illustrated in FIGS. 2C and 2D. Software can configure how much bandwidth each of the QOS levels can consume at the egress port of the router by allocating the number of tokens that are put into the rate meter. The respective bandwidth allocations are reflected in the drop probability curves of FIGS. 2A-2D to allocate space on a per QOS level that is consistent with the amount of bandwidth that is able to be consumed by that particular QOS level.

When a queue is full, it is important that each of the QOS levels are allocated their memory space, such that the total of the four memory space utilizations equal 100%. Thus the threshold utilization of 10% on curve 201 of FIG. 2A plus the 20% on FIG. 2B, 30% on FIG. 2C, and 40% on FIG. 2D, add to 100%, such that the entire common memory space is utilized fully, but no individual QOS level consumes more than its allocation.

FIGS. 3A-3D are graphic representations showing how the drop probabilities are modified when the total of the four QOS levels now consume only 80% of the common memory space. The 20% excess bandwidth can then be used by any QOS level that needs it. In FIGS. 3A-3D, it is shown that 20% overall excess bandwidth capacity is added to each of QOS levels 0, 1, 2, and 3 illustrated respectively in FIGS. 3A, 3B, 3C and 3D.

Figure 3A:
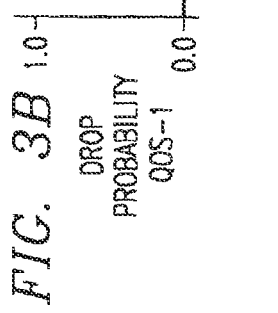

For example in FIG. 3A for QOS level 0, the packet drop threshold 302 occurs at 302 utilization, whereas in FIG. 2A the threshold occurs at 10% utilization, which is a 20% lower utilization than in FIG. 3A. The 20% excess available bandwidth is given simultaneously to each of the four QOS levels, such that QOS level 0, instead of being 10% is now 30%, QOS 1 in FIG. 3B, instead of being 20% is 40%, QOS 2 in FIG. 3C instead of being 30% is 50%, and QOS 3 in FIG. 3D instead of being 40% is now 60%. Thus, any of the four QOS levels could consume 20% more than its allocated memory space, which is acceptable because the common memory pool is only 80% full. As the common memory pool becomes less full, each of the four QOS levels is given a steadily increasing allocation. If at any point in time in FIGS. 3A-3D overall utilization were to exceed the 80% full point, then each of these curves would move back to the left, gradually allocating a correspondingly smaller memory space for each individual queue, preventing any single queue from excessively consuming the shared memory space. Thus each of the queues can have its full memory space allocation, but if any queue does not use all of its allocation, then any of the other queues can use that memory space. This is an example of the flexible algorithm described below that actually implements this function in hardware.

FIGS. 4A-4D are graphic representations of calculated drop probabilities when the total common memory space is 50% utilized. In FIG. 4A, instead of 10% bandwidth allocated to QOS level 0, 50% is added, resulting in 60% available for QOS level 0. Similarly for QOS levels 1, 2, and 3, 50% is added to each of their respective allocated bandwidths. This implies that overall only 50% of the common memory space is utilized and that in each of these curves the actual individual queue utilization is less than the initial threshold, for example point 402 in FIG. 4A, such that no queue at this point is being overconsumed and such that no packets are being dropped. However, if QOS level 0 actually started to consume 65% queue utilization, some percentage of the packets would be dropped even though overall common memory utilization is only 50%.

A Queue Congestion Management algorithm implemented in hardware in Queue Congestion Manager and WRED block 12 controls instantaneous queue space congestion management for one particular tributary, as follows:

```
// Physical queue limits
(2.1)     memByteCnt = txQueue.totalByteCnt( );
(2.2)     queByteCnt =
              txQueue.queByte.Cnt(pkt->dstTrib( ),pkt->qos( )):
(2.3)     minSize = config.egressMinSize(pkt->qos( )) –
              memByteCnt*config.egressMinSlope(pkt-<qos( ));
(2.4)     maxSize = config.egressMaxSize(pkt->qos( )) –
              memByteCnt*config.egressMaxSlope(pkt->qos( ));
(2.5)     if (queByteCnt < minSize)
              dropProb=0;
(2.6)     else if (queByteCnt < maxSize)
              dropProb = (queByteCnt – minSize) / (maxSize –
              minSize);
(2.7)     else dropProb = 1;
```

The hardware monitors the instantaneous actual sizes of the queue utilizations to make these calculations. The total amount of memory space in bytes is stored in a hardware register memByteCnt, as shown in Equation 2.1. Every time a packet is assigned to any of the queues or extracted from a queue, a queue byte count hardware register queByteCnt is updated to reflect the total amount of bytes in each of the four individual QOS queues for that tributary, as shown in Equation 2.2. The threshold intercept point, for example point 202 in FIG. 2A, is represented by a configuration value config.egressMinSize, which is stored in a hardware CSR and is indexed by QOS level. Point 202 is the allocated minimum threshold of space allocation for QOS level 0. Regardless of whether the queue is full, that amount of space is always available to that particular QOS level. However, as the total common memory utilization is decreased, point 202 moves to the right, as illustrated in FIGS. 3A and 4A, to allocate more space for an individual queue.

In Equation 2.3 the minimum queue size MinSize is calculated by representing the slope in curve 201 by another configuration value config.egressMinSlope, which is then multiplied by the memory byte count memByteCnt to modify the config.egressMinSize value. Equation 2.4 calculates the maximum size maxSize starting with a configured value config.egressMaxSize, which is the value to be used when the queue is fully consumed and is indexed by the appropriate QOS level. That value is then modified by config.egressMaxSlope multiplied by the memory byte count memByteCnt to displace that value to the right as the common memory utilization decreases.

Next a comparison of the actual queue size for that queue is performed to compute the drop probability. In Equation 2.5 if the actual queue size is less than the calculated minimum size, then the drop probability is set to zero. If the actual queue size is between the maximum and minimum size according for example to curve 201, then the drop probability is calculated by using the slope of the curve, namely queByteCnt less minSize divided by the quantity maxSize minus minSize, as shown in Equation 2.6. This calculates a drop probability along curve 201 for example from point 202 to point 203. Finally in Equation 2.7, if the queue size is greater than the value at point 203, then the drop probability is set to unity. Queue Congestion Manager and WRED block 12 of FIG. 1 calculates this drop probability and also calculates a random number between the value of 0 and 1.0, to determine if the individual packet should be dropped or passed on through and then queued in the appropriate QOS level queue.

The quantities that are used to calculate the drop probability can extend over a wide dynamic range, including fractional numbers as well as very large numbers, depending upon how they are used in these equations and the actual size of the queues and packets. Instead of using integer values typically used in hardware design for these types of equations, a small floating point format is actually used. This floating point format uses a four-bit normalized mantissa, which implies that the most significant bit of the mantissa always has the value 1. The four-bit mantissa is normalized such that the value always is between the values of 0.5 and 1.0. The floating point format has a 6-bit exponent biased such that it is between 0 and a maximum value of 63. This allows the exponent to have a range of –32 to +31, obtained from taking the 6-bit value and subtracting off a bias value of 32. In the equations, only the positive numbers are required, such that no sign is needed for the floating point numbers. All of the algorithms require these numbers greater than or equal to zero. With such a small mantissa, multiply and divide operations are accomplished with simple look up tables, for example two 3-bit inputs result in one 4-bit output. Since the most significant bit of the mantissa always has a value of one, it does not need to be explicitly represented, but is rather implied, and does not need to be part of the two 3-bit inputs in table lookups.

Figure 5A:
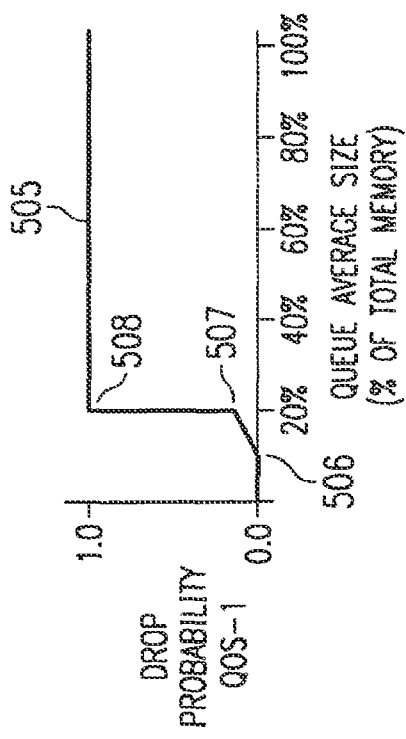
FIGS. 5A-5D are graphic representations of weighted random early discard probability curves for each of four QOS levels.
Figure 5B:
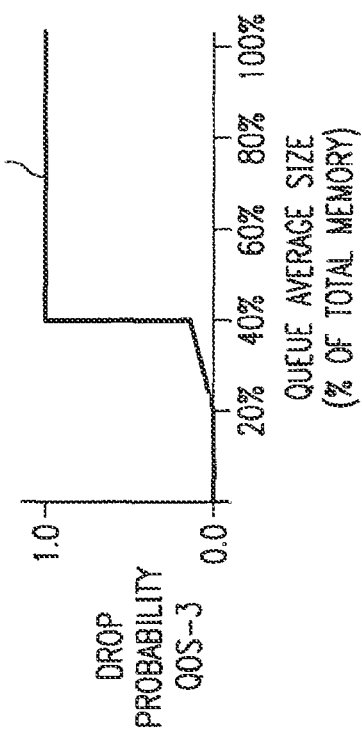
Figure 5C:
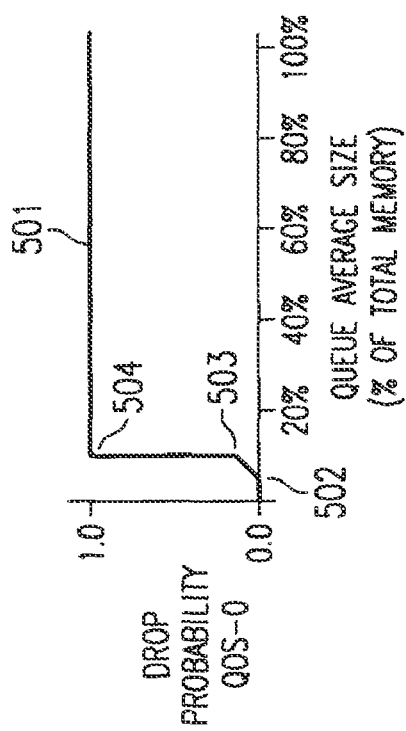
Figure 5D:
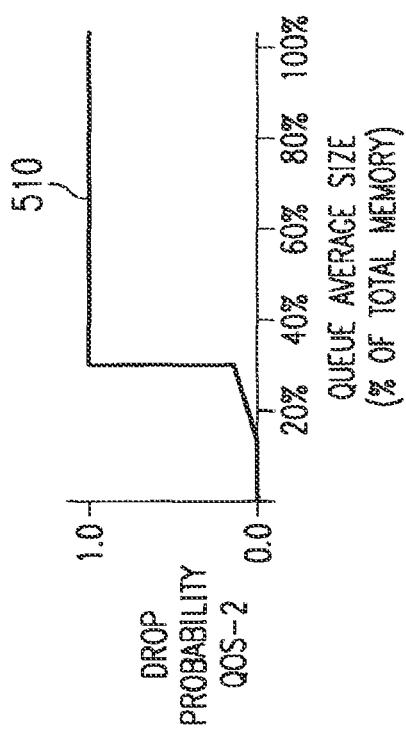

FIGS. 5A-5D are graphic representations of weighted random early discard (WRED) probability curves for each of four QOS levels QOS-0 through QOS-3. In FIG. 5A, assuming a 10% overall bandwidth allocated to QOS level 0 as in FIGS. 2A-2D, curve 501 has a threshold 502 which is less than 10% utilization. Threshold 502 is the value of the average common memory space that is being used by QOS level 0 at which a small number of packets begin to be dropped. At a point 503 the amount of memory space consumed by QOS level 0 has reached a maximum, such that the drop probability at point 503 immediately goes vertically to unity, as indicated by point 504. These curves are implemented by the WRED algorithm, which is well known in the literature. In the present embodiment, however, the WRED algorithm is applied concurrently to four different QOS levels all sharing a common memory space, such that a certain portion of the overall memory space is allocated to each of the QOS levels. For example, in FIGS. 5A-5D the maximum memory space allocated to QOS level 0 is 10%, whereas QOS levels 1, 2, and 3 receive respectively 20%, 30%, and 40%. These respective allocations of shared memory pool space are the same as the corresponding queue bandwidth allocations of each QOS level queue, as described above in connection with FIGS. 2A-4D.

In the present embodiment, the WRED algorithm applied to egress queuing is:

```
// WRED for egress queueing
(3.1)     avgByteCnt = txQueue.avgByteCnt(pkt->dstTrib( ));
(3.2)     prob1 = avgByteCnt *
              config.egressWredConst1(pkt->qos( )) –
              config.egressWredConst2(pkt->qos( ));
(3.3)     dropProb = pkt->size( ) * prob1;
(3.4)     wredCnt = txQueue.wredCnt(pkt->dstTrib( ), pkt->qos( ));
(3.5)     if (!pkt->wredDisable ( ) & &
              (avgByteCnt >
              config.egressQueMaxThresh(pkt->qos( )) ||
              avgByteCnt > config.egressQueMinThresh
              (pkt->qos( )) & &
              rndDrop – rndDrop * wredCnt *
              dropProb <dropProb( ) {
// drop packet
(3.6)     txQueue.wredCnt (pkt->dstTrib( ), pkt->qos( ), 0);
              deletepkt;
          } else {
              txQueue.append(pkt);
```

-continued (3.7) txQueue.wredCnt(pkt->dstTrib( ), pkt->qos( ), wredCnt+1);
}
}

In Equation 3.1 of the WRED algorithm, an average byte count avgByteCnt is obtained for the particular queue into which a packet is being placed, that is indexed by both the destination tributary and the QOS level of the incoming packet. The average byte count is calculated by determining the time weighted average for the actual byte count for that particular queue. In Equation 3.2 a probability prob1 is calculated by multiplying the average byte count avgByteCnt by a constant config.egressWredConst1 and then subtracting a different constant config.egressWredConst2. These constants are a base and a slope corresponding to points 502 and 503 in FIG. 5A. In Equation 3.3 the drop probability dropProb is calculated by multiplying prob1 by the size of the packet, such that the smaller the packet the less likely it will be dropped. This is desirable to minimize the likelihood that a TCP/IP acknowledge packet will be dropped. In equation 3.4, the wredCnt value for the target queue is obtained. The wredCnt is used to make the interval between dropped packets uniform in delay. The wredCnt is incremented by one each time a packet is not dropped, and set to zero when a packet is dropped. The conditional expression of equation 3.5 determines if a packet is a candidate to be dropped by examining the WRED disable bit associated with the packet, and be determining if the average byte count, avgByteCnt, is within the region where packets are dropped. Average byte counts less than egressQueueMinThresh are not dropped. Average byte counts in the range from egressQueueMinThresh and egressQueueMaxThresh are dropped using the specified probability function.

Equation 3.6 is performed when a packet is to be dropped. The equation sets the wredCnt for the specific target queue to the value zero. Likewise, equation 3.7 is performed when a packet is appended to a queue. Equation 3.7 is used to increment the value of wredCnt by one. Once a packet is dropped, it is deleted entirely from the router. The entire algorithm is implemented in hardware using the floating point format as described above. Additionally, Queue Congestion Manager Block 12 checks common shared memory space 13, and if shared memory space has been fully consumed, then drops the packet independently of the instantaneous congestion management as well as random early discard management.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, composition of matter, means, methods, or steps.

What is claimed is:

1. A method comprising:
receiving packets into a number of queues;
allocating memory to the queues;
determining a memory utilization;
over-subscribing unused memory;
allocating the over-subscribed memory to the queues; and
adjusting packet drop probabilities of one or more queues based at least on the allocation of the over-subscribed memory among the queues.

2. The method of claim 1, further comprising:
assigning the received packets to the queues in accordance with their quality of service (QOS) priority levels.

3. The method of claim 1, further comprising dropping received packets based at least on each queue's packet drop probability.

4. The method of claim 3, wherein the packet dropping is performed by hardware.

5. The method of claim 3, wherein dropping the packets comprises applying a weighted random early discard method with the packet drop probabilities.

6. The method of claim 1, further comprising dynamically calculating a minimum and maximum size of a respective queue.

7. The method of claim 1, wherein the queues are at an egress side of a router.

8. A switching system, comprising:
a receiving mechanism configured to receive packets into a number of queues;
a memory allocation mechanism configured to:
 allocate memory to the queues;
 determine a memory utilization;
 over-subscribe unused memory; and
 allocate the over-subscribed memory to the queues; and
a packet-dropping mechanism configured to adjust packet drop probabilities of one or more queues based at least on the allocation of the over-subscribed memory among the queues.

9. The switching system of claim 8, wherein the receiving mechanism is further configured to assign the received packets to the queues in accordance with their quality of service (QOS) priority levels.

10. The switching system of claim 8, wherein the packet-dropping mechanism is configured to drop received packets based at least on each queue's packet drop probability.

11. The switching system of claim 10, wherein the packet dropping is performed by hardware.

12. The switching system of claim 10, wherein while dropping the packets the packet-dropping mechanism is configured to apply a weighted
random early discard method with the packet drop probabilities.

13. The switching system of claim 8, wherein the memory allocation mechanism is further configured to calculate dynamically a minimum and maximum size of a respective queue.

14. The switching system of claim 8, wherein the queues are at an egress side of the switching system.

15. A switching means, comprising:
a receiving means for receiving packets into a number of queues;
a memory allocation means for:
 allocating memory to the queues;
 determining a memory utilization;
 over-subscribing unused memory; and
 allocating the over-subscribed memory to the queues; and a packet-dropping means for adjusting packet drop probabilities of one or more queues based at least on the allocation of the over-subscribed memory among the queues.

16. The switching means of claim 15, wherein the receiving means is for assigning the received packets to the queues in accordance with their quality of service (QOS) priority levels.

17. The switching means of claim 15, wherein the packet-dropping means is further for dropping received packets based at least on each queue's packet drop probability.

18. The switching means of claim 17, wherein the packet dropping is performed by hardware.

19. The switching means of claim 17, wherein while dropping the packets the packet-dropping means applies a weighted random early discard method with the packet drop probabilities.

20. The switching means of claim 15, wherein the memory allocation means is further for calculating dynamically a minimum and maximum size of a respective queue.

21. The switching means of claim 15, wherein the queues are at an egress side of the switching system.

* * * * *